United States Patent
Guntaka et al.

(10) Patent No.: US 9,823,462 B1
(45) Date of Patent: Nov. 21, 2017

(54) COLORED INSULATED NOTCH DESIGN FOR PIXELS IN ELECTROWETTING DISPLAYS

(71) Applicant: Amazon Technologies, Inc., Seattle, WA (US)

(72) Inventors: Tulasi Sridhar Reddy Guntaka, Eindhoven (NL); Karel Johannes Gerhardus Hinnen, Eindhoven (NL); Gor Manukyan, Veldhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/065,257

(22) Filed: Mar. 9, 2016

(51) Int. Cl.
*G02B 26/00* (2006.01)
*G02B 26/08* (2006.01)
*G02F 1/29* (2006.01)
*G02B 5/20* (2006.01)

(52) U.S. Cl.
CPC .......... *G02B 26/005* (2013.01); *G02B 5/201* (2013.01)

(58) Field of Classification Search
USPC ....... 359/237, 242, 245, 247, 267, 251, 252, 359/253, 254, 263, 265, 266, 269, 290, 359/291, 292, 295, 298
See application file for complete search history.

(56) References Cited

U.S. PATENT DOCUMENTS 9,678,330 B1 * 6/2017 Sakai .................. G02B 26/005
2016/0282605 A1 * 9/2016 Petcu ...................... G02B 1/04

* cited by examiner

*Primary Examiner* — Joseph P Martinez
*Assistant Examiner* — Brandi Thomas
(74) *Attorney, Agent, or Firm* — Lee & Hayes, PLLC

(57) ABSTRACT

Instead of using a clear or a semi-transparent notch within an electrowetting display, a colored notch that is the same color of the pixel region extends from one of the pixel walls toward an opposing pixel wall of the pixel region. The colored notches follow a non-flipped arrangement within each of the pixel regions. For example, each colored notch is adjacent to the same respective pixel wall for a pixel region. In other configurations, the colored notches follow a flipped arrangement within each of the pixel regions. For example, a colored notch of one pixel region and a colored notch of another pixel region are adjacent to the same pixel wall (on opposing sides). Instead of including a separate white sub pixel for each pixel, each pixel region is at least partially covered by a white color filter and a color filter that is the color of the pixel.

20 Claims, 8 Drawing Sheets

COLORED INSULATED NOTCH DESIGN FOR PIXELS IN ELECTROWETTING DISPLAYS

BACKGROUND

An electrowetting display includes an array of pixels individually bordered by pixel walls that retain liquid, such as opaque oil. Light transmission through each pixel is adjustable by electronically controlling a position of the liquid in the pixel. Resolution and quality of an electrowetting display may depend on a number of factors, such as optical transmissivity or reflectivity of material layers of the electrowetting display and pixel size, just to name a few examples. In some examples, pixel walls may be substantially transparent so as to transmit a wide portion of the visible part of the electromagnetic (EM) spectrum. Such transmission may allow light to pass through pixel walls from one pixel to adjacent pixels. Generally, adjacent pixels correspond to colors that are different from one another (e.g., a red pixel adjacent to a blue pixel adjacent to a green pixel, and so on). Light transmitted through pixel walls may contribute to photo crosstalk between the adjacent pixels.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
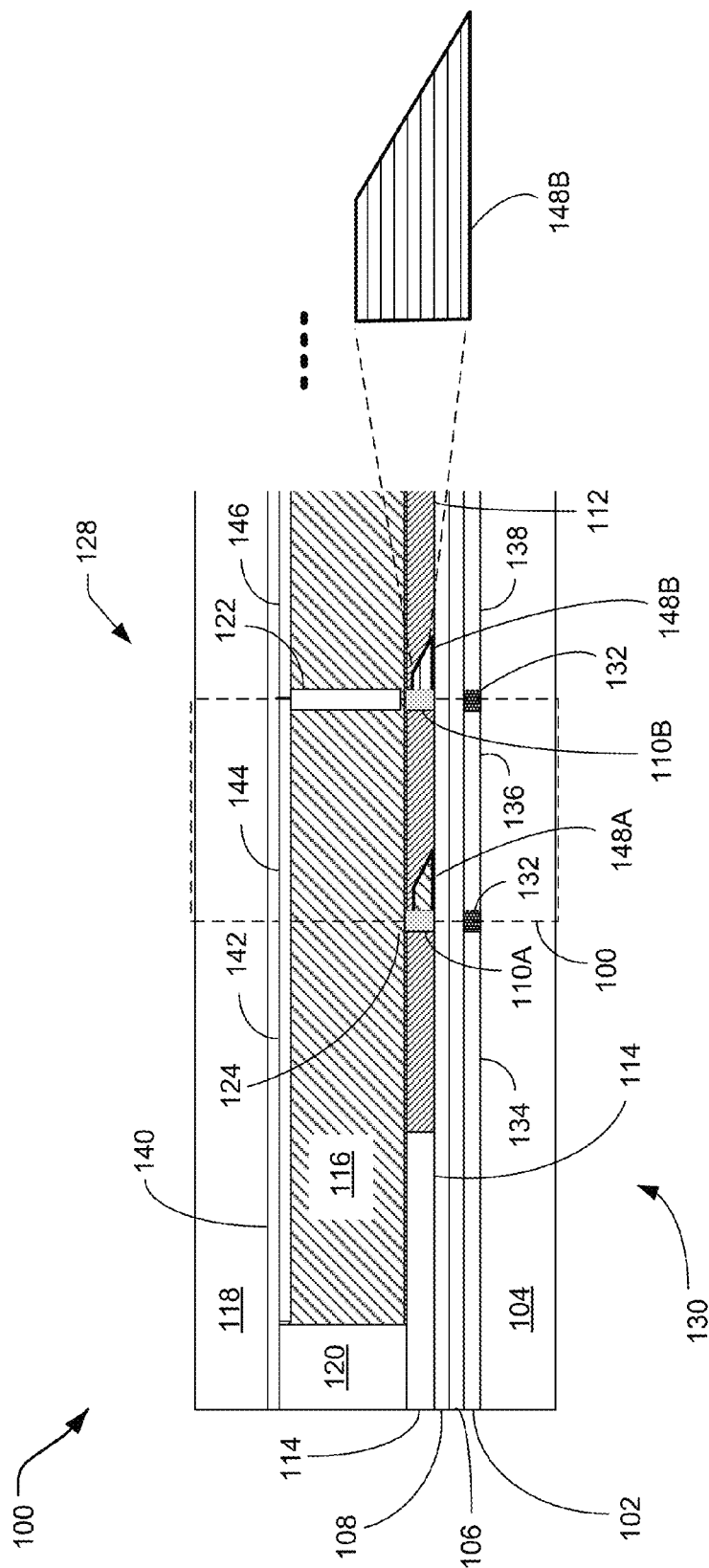
FIG. 1 is a cross-section of a portion of an electrowetting display device including colored notches, according to some examples.

In various examples described herein, electronic devices include electrowetting displays for presenting content and other information. The electrowetting displays include an array of pixel regions individually bordered by pixel walls. According to some configurations, each of the pixel regions includes a colored notch that extends from one of the pixel walls bordering the pixel region toward an opposing pixel wall bordering the pixel region. The height of the pixel wall is higher compared to the height of the colored notch such that electrowetting oil can cover both the colored notch as well as the portion of the pixel region that does not include the colored notch. In some examples, the colored notches may be covered with and/or formed from a dielectric material that, generally, does not have a high dielectric constant in comparison to the electrowetting oil that is contained within the pixel regions. Thus, the colored notch may be referred to herein as an "insulated notch" and/or a "colored insulated notch."

The color of the colored notch corresponds to the color of the pixel region. For example, in a red pixel region, the colored notch is red. In a blue pixel region, the colored notch is blue and in a green pixel region, the colored notch is green. In other examples, the colored notches and pixel regions may include different colors and/or a different number of colors.

According to some configurations, the colored notches follow a non-flipped arrangement within each of the pixel regions. For example, each colored notch is adjacent to a different pixel wall for a pixel region (e.g., the left pixel wall of a pixel region and a right pixel wall of the pixel region). In other configurations, the colored notches follow a flipped arrangement within each of the pixel regions. For example, a colored notch of one pixel region and a colored notch of another pixel region are adjacent to the same pixel wall (on opposing sides of the same pixel wall).

An electrowetting display that includes notches can be beneficial for control of the motion of the oil that is contained within the pixel regions. Instead of forming the notches from transparent photo definable material (e.g. pixel wall material), the photo definable material is colored to match the color of the pixel. Including colored notches within the pixel may increase brightness, and contrast for the electrowetting display while reducing the amount of photo cross talk.

In some examples, instead of including a separate white sub pixel for each pixel, each pixel region is at least partially covered by a white color filter and a color filter that is the color of the pixel. For instance, the portion of a red pixel region that includes a red notch can be covered by a white color filter and the other portion of the red pixel region not including the red notch is covered by a red color filter. As will be described in more detail below, including a white color filter within each pixel region may also increase brightness, and contrast for the electrowetting display while reducing the amount of photo cross talk.

In some configurations, the electronic devices may include one or more components associated with the electrowetting display, such as a touch sensor component layered atop the electrowetting display for detecting touch inputs, a front light or back light component for lighting the electrowetting display, and/or a cover layer component, which may include antiglare properties, antireflective properties, anti-fingerprint properties, anti-cracking properties, and the like. Various examples described include techniques for assembling electronic devices including these components for the electrowetting displays and other features described herein.

FIG. 1 is a cross-section of a portion of a reflective electrowetting display device illustrating several electrowetting pixels 100 including colored notches, according to some examples. Though three such electrowetting pixels are illustrated, an electrowetting display device may include any number (usually a very large number, such as thousands or millions) of electrowetting pixels. An electrode layer 102 is formed on a first (e.g., bottom) support plate 104 and may comprise one or more individual electrodes in each electrowetting pixel.

In various examples, electrode layer 102 may be connected to any number of thin film transistors (TFTs) (not illustrated) that are switched to either select or deselect electrowetting pixels 100 using active matrix addressing, for example. A TFT is a particular type of field-effect transistor that includes thin films of an active semiconductor layer as well as a dielectric layer and metallic contacts over or on a supporting (but non-conducting) substrate, which may be glass or any of a number of other transparent or non-transparent materials, for example.

In some implementations, a barrier layer 106 may separate electrode layer 102 from a hydrophobic layer 108 also formed on first support plate 104. In some implementations, hydrophobic layer 108 may comprise any of a number of types of fluoropolymers, such as AF1600®, produced by DuPont, based in Wilmington, Del. Hydrophobic layer 108 may also be any of a number of water-repelling materials that affect wettability of an adjacent material, for example.

Pixel wall 110A and pixel wall 110B, collectively referred to as "110", form a patterned electrowetting pixel grid on hydrophobic layer 108. Pixel walls 110 may comprise one or more photoresist materials such as, for example, epoxy-based negative photoresist SU-8. In some examples, the pixel walls 110 are clear or at least partially transparent.

As illustrated in FIG. 1, a colored notch 148A extends from the pixel wall 110A bordering the pixel region 100 toward an opposing pixel wall 110B of the pixel region 100. The color of the notch corresponds to the color of the pixel region. In the current example, assume that pixel region corresponds to a red pixel and the colored notch 148A is red. A colored notch 148B extends from the pixel wall 110B toward an opposing pixel wall (not shown) of the pixel region adjacent to the pixel region 100. Assume that pixel region containing the colored notch 148B corresponds to a green pixel and the colored notch 148B is green. In some examples, a colored notch 148 has a height that is below the height of an adjacent pixel wall 110, a length between about ten percent to thirty percent of the width of a pixel region 100, and a width that is the width (or close to the width) of the pixel region 100. In some configurations, the notch 148 can be tapered on the end of the notch that is farthest away from the pixel wall. The taper may assist in the flow of oil that is disposed over the notch 148.

As will be described in more detail below, the size and/or shape of a colored notch may vary between electrowetting display devices. For example, the height of a colored notch can be configured to be almost the height of the pixel wall. In some configurations, the height of the colored notch ranges is between the range from about twenty five percent of the height of the pixel wall to about three quarters the height of the pixel wall. Generally, the height of the colored notch affects the movement of the fluid 112 within the pixel regions. Similarly, the length of a colored notch 148 may be a small length relative to the size of the pixel region to a relatively long length of the pixel region. In some examples, the length of the colored notch is between the range from about ten percent of the width of the pixel region to about thirty percent of the width of the pixel region. Other lengths can be utilized. In some configurations, the width of the colored notch is the width of the pixel region such that the colored notch 148 touches (or nearly touches) pixel walls on opposite sides of the pixel region. Further, while the shape of the colored notch 148 is illustrated as a trapezoid, the colored notch can be other shapes (e.g., square, triangular) and/or include different ends (e.g., curved, more slope compared to the slope of the end of the colored notch 148A or 148B, less slope).

In some examples, the colored notches 148 may be formed from the same material as pixel walls. For instance, the pixel wall material used for the pixel walls 110 can be pigmented with a red color to create the red colored notch 148A and can be pigmented with a green color to create the green colored notch 148B. Other pigments can be used to create colored notches of other colors. According to some configurations, the colored notch can be covered with and/or formed from a dielectric material that, generally, does not have a high dielectric constant in comparison to the fluid 112 (e.g., electrowetting oil) that is contained within the pixel regions.

In the current example, the colored notches 148A-148B follow a non-flipped arrangement within each of the pixel regions. For example, the colored notch 148A is illustrated as being in physical contact with the pixel wall 110A and the colored notch 148B is illustrated as being in physical contact with the pixel wall 110B. In other configurations, the colored notches 148 can follow a flipped arrangement within each of the pixel regions. For example, a colored notch of one pixel region and a colored notch of another pixel region are adjacent to the same pixel wall but on opposing sides of the pixel region. As briefly discussed above, an electrowetting display that includes notches can be beneficial for control of the motion of the fluid 112 that is contained within the pixel regions. Including colored notches within the pixel may increase brightness, and contrast for the electrowetting display while reducing the amount of photo cross talk.

The patterned electrowetting pixel grid comprises rows and columns that form an array of electrowetting pixels. For example, an electrowetting pixel may have a width and length in a range of about 50 to 500 microns. In some implementations, the pixel walls and/or the colored notches 148 need not be on the hydrophobic layer. For example, pixel walls may be directly on the electrode layer (not illustrated in FIG. 1).

A first fluid 112, which may have a thickness (e.g., depth, height) in a range of about 1 to 10 microns, for example, overlies hydrophobic layer 108 and covers the colored notches 148A-148B. First fluid 112 is partitioned by pixel walls 110 of the patterned electrowetting pixel grid. An outer rim 114 may comprise the same material as pixel walls 110. A second fluid 116, such as an electrolyte solution, overlies first fluid 112 and pixel walls 110 of the patterned electrowetting pixel grid. First fluid 112 is at least partially immiscible with second fluid 116 so that the first fluid and the second fluid do not substantially mix with each other, and in some examples do not mix with each other to any degree. Herein, substances are immiscible with one another if the substances do not substantially form a solution. Second fluid 116 is preferably transparent, but may be colored. First fluid 112 is non-polar and may for instance be an alkane like hexadecane or (silicone) oil.

A second (e.g., top) support plate 118 covers second fluid 116 and edge seals 120 maintain second fluid 116 over the electrowetting pixel array. Support plate 118 may be supported by edge seals 120 and a spacer grid 122, a portion of which is illustrated in FIG. 1. Spacer grid array 122 may substantially extend over the array of pixels 100. For example, portions of spacer grid 122 may extend from tops 124 of pixel walls 110 to second support plate 118. Spacer grid array 122 and pixel walls may be substantially aligned with one another.

The reflective electrowetting display device has a viewing side 128 on which an image formed by the electrowetting display device may be viewed, and a rear side 130. Second support plate 118 faces viewing side 128 and first support plate 104 faces rear side 130. The electrowetting display device may be an active matrix driven display type or a passive matrix driven display, just to name a few examples.

Separation block 132 represents a discontinuity of electrical conductivity along electrode layer 102. For example, a first portion 134 of electrode layer 102 may be electrically insulated or separated from a second portion 136 and a third portion 138 of electrode layer 102 so that each portion 134, 136, and 138 is connected to a respective pixel region. Electrode layer 102 need not extend to edges of the display area of the electrowetting display device, as illustrated in the figure.

In some examples, electrowetting pixels may include a second electrode 140 disposed on second support plate 118, and color filters 142, 144, and 146 over individual pixels. The electrode on the second support plate may or may not be patterned to form any of a number of circuit configurations, for example.

In some examples, color filters of adjacent pixels may have different colors. Thus, for example, color filter 142 may be red, color filter 144 may be green, and color filter 146 may be blue. In such an example, the left-most illustrated pixel may be a red pixel, the middle pixel may be a green pixel, and the right-most illustrated pixel may be a blue pixel. In other configurations, two colors may be included in the color filter that is above a pixel. Instead of including a separate white sub pixel for each pixel, each pixel region is at least partially covered by a white color filter and a color filter that is the color of the pixel. For instance, the portion of a red pixel region that includes the red notch 148A can be covered by a white color filter and the other portion of the red pixel region 100 not including the red notch 148A is covered by a red color filter.

Hydrophobic layer 108 is arranged on first (e.g., bottom) support plate 104 to create an electrowetting surface area. The hydrophobic character causes first fluid 112 to adhere preferentially to first support plate 104 since first fluid 112 has a higher wettability with respect to the surface of hydrophobic layer 108 than second fluid 116. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the fluid tends to form a film on the surface of the solid.

First fluid 112 absorbs at least a part of the optical spectrum. First fluid 112 may be transmissive for a part of the optical spectrum, forming a color filter. For this purpose, the fluid may be colored by addition of pigment particles or dye, for example. Alternatively, first fluid 112 may be colored or black (e.g., absorbing substantially all parts of the optical spectrum) or reflecting. Hydrophobic layer 108 may be transparent or colored. A reflective layer may reflect the entire visible EM spectrum, making the layer appear white, or part of it, making it have a color.

If a voltage is applied across electrowetting pixel 100 (e.g., between electrode layer 102 and second electrode 140), electrowetting pixel 100 will enter into an active state. Electrostatic forces will move second fluid 116 toward electrode layer 102, thereby displacing first fluid 112 from the area of hydrophobic layer 108 to pixel walls 110 surrounding the area of hydrophobic layer 108, to a droplet-like shape. Such displacing action at least partly uncovers first fluid 112 from the surface of hydrophobic layer 108 of electrowetting pixel 100.

If the voltage across electrowetting pixel 100 is returned to an inactive signal level of zero or a value near to zero, electrowetting pixel 100 will return to an inactive state, where first fluid 112 flows back to cover hydrophobic layer 108. In this way, first fluid 112 forms an electrically controllable optical switch in each electrowetting pixel 100. Of course, such details of an electrowetting display device are merely examples, and claimed subject matter is not limited in this respect.

Figure 2:
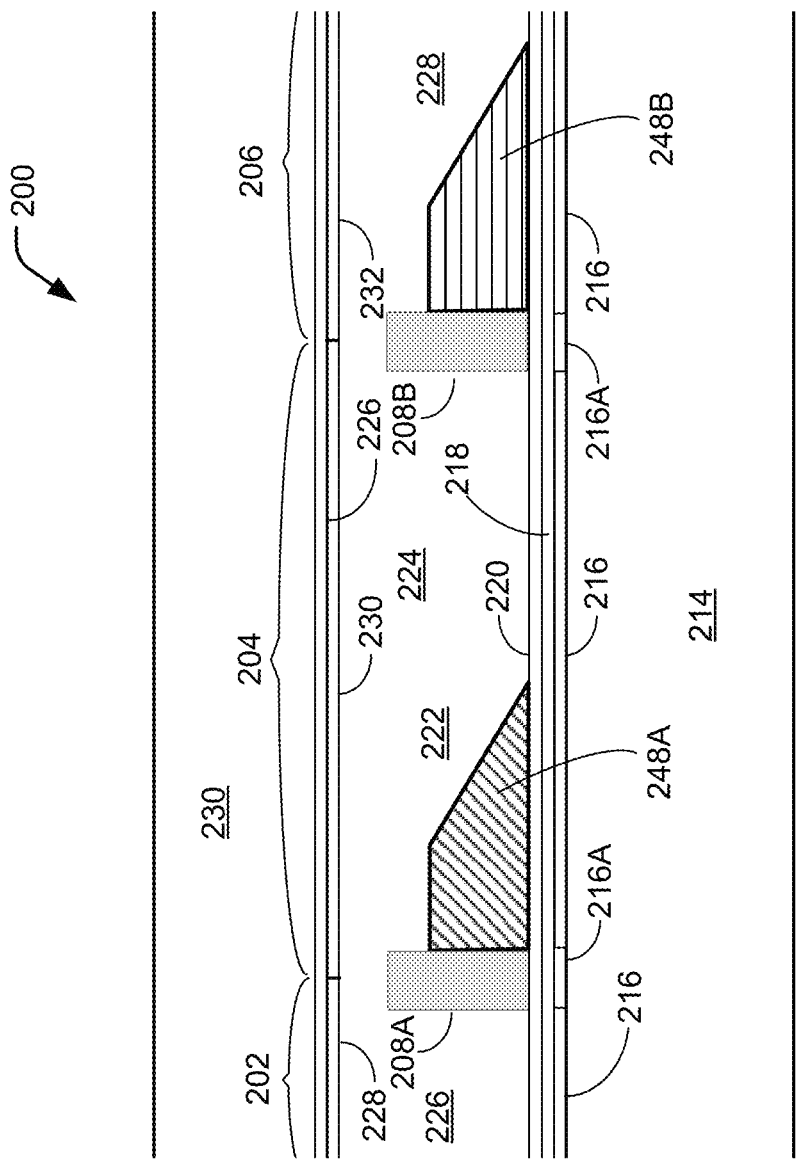
FIG. 2 is a cross-section view of electrowetting pixels including colored notches, according to some examples.

FIG. 2 illustrates a cross-section view 200 of electrowetting pixels, including colored notches, according to some examples. In particular, view 200 illustrates a portion of a pixel region 202, a pixel region 204, and a portion of pixel region 206. Pixel region 202 is bordered by a pixel wall 208. As illustrated, the pixel wall is transparent or semi-transparent and allows at least a portion of impinging light to pass through the pixel wall. As discussed above, each of the pixel regions includes a colored notch (e.g., red, green, or blue).

An object "having a color" may indicate that the object comprises a material of that color. For example, a colored notch 248 having a color of "red" comprises a material that transmits a particular portion of the optical spectrum corresponding to the color red. Thus, the material may appear to be the color and substantially transmit the color. A pixel or pixel region "having a color" means that the pixel or pixel region is configured to produce the color as a pixelated portion of an image. The pixel or pixel region may be covered by a color filter comprising a material that transmits a particular portion of the optical spectrum corresponding to the color. In other configurations, such a colored filter may be located in another part of the pixel or pixel region (e.g., on a bottom support plate).

Pixel regions 202-206 may be located on a support plate 214, which may be substantially flat, and may include, among other things, a conductive layer 216 (e.g., an electrode layer), a dielectric barrier layer 218, and an AF layer 220 at least partially covering the dielectric barrier layer. The conductive layer, dielectric barrier layer, and the AF layer may be formed or otherwise disposed on support plate 214. For a particular example, dielectric barrier layer 218 may comprise SiN, SiON, SiO, or TaO, just to name a few examples, and may have a thickness in a range from about 100 nanometers up to about 500 nanometers. In some implementations, the dielectric barrier layer may comprise a multilayer structure that includes organic and inorganic sublayers. An organic layer may comprise polyamide, for example. An organic layer may have an insulating property higher than that of an inorganic layer so as to reduce the amount of leakage current between conductive layer 216 and a fluid portion 222, for example.

In some examples, pixel walls 208 and/or colored notches 248 may be disposed directly on AF layer 220. In other examples, pixel walls 208 and/or colored notches 248 may be disposed directly on conductive layer 216 or dielectric barrier layer 218. In some examples, an integrated pixel wall and colored notch may be formed (not shown). Thickness of conductive layer 216 may be in a range from about 200 nanometers up to about 300 nanometers. In substantially the same plane as conductive layer 216, an insulative material or dielectric material 216A may be located between adjacent portions of conductive layer 216. Fluid portion 222, which may comprise one or more different fluids that are immiscible with one another, may cover the stack of conductor(s) and dielectric(s) 216, 218, and AF layer 220. In some examples, fluid portion 222 may be considered to include a first portion 224 comprising fluid portion 222 between pixel walls 210 of pixel region 204, include a second portion 226 comprising fluid portion 222 to the left (in the figure) of pixel wall 208 of pixel region 202, and include a third portion 228 comprising fluid portion 222 to the right (in the figure) of pixel wall 208B of pixel region 206, for example.

The presence of a colored notch 248 within a pixel regions means that the thickness of an electrowetting oil over the colored notch is less than the thickness of electrowetting oil over the other portion of the pixel region. One or more dielectric layers (not illustrated) may be located on a colored notch 248A. Such dielectric layer(s) may generally not have a high dielectric constant in comparison to the electrowetting oil. This may create a fringe electric field effect that is greater due to the presence of the end of the pixel electrode in conjunction with the substrate. Due to the greater fringe electric field effect and the thinness of the electrowetting oil on the dielectric layer the pixel may tend to open at the dielectric layer more consistently and accurately. Accordingly, the pixels will all generally have a similar manner of movement of the electrowetting oil from the dielectric layer towards the opposite end of the pixel away from the colored notch, although the direction of movement of the electrowetting oil within some or all of the pixels may be designed to be different.

A top support plate 230 may be located over fluid portion 222, overlaying the structure (e.g., pixel walls, conductive layer, hydrophobic layer, and so on) disposed on bottom support plate 214. A top electrode layer 226 and color filters 228-232 may be disposed on top support plate 230. Each color filter may be disposed over individual pixel regions. For example, color filter 228 may be placed in or over pixel region 202 so that substantially all light entering pixel region 202 travels through color filter 228. Similarly, color filter 230 may be placed in or over pixel region 204 so that substantially all light entering pixel region 204 travels through color filter 230, and color filter 232 may be placed in or over pixel region 206 so that substantially all light entering pixel region 206 travels through color filter 232. As discussed briefly above, and in more detail in FIG. 3, a color filter that is above a pixel region may include both a white color filter and a color filter that is the same (or substantially similar) to the color of the colored notch 248 or the color of the pixel.

Figure 3:
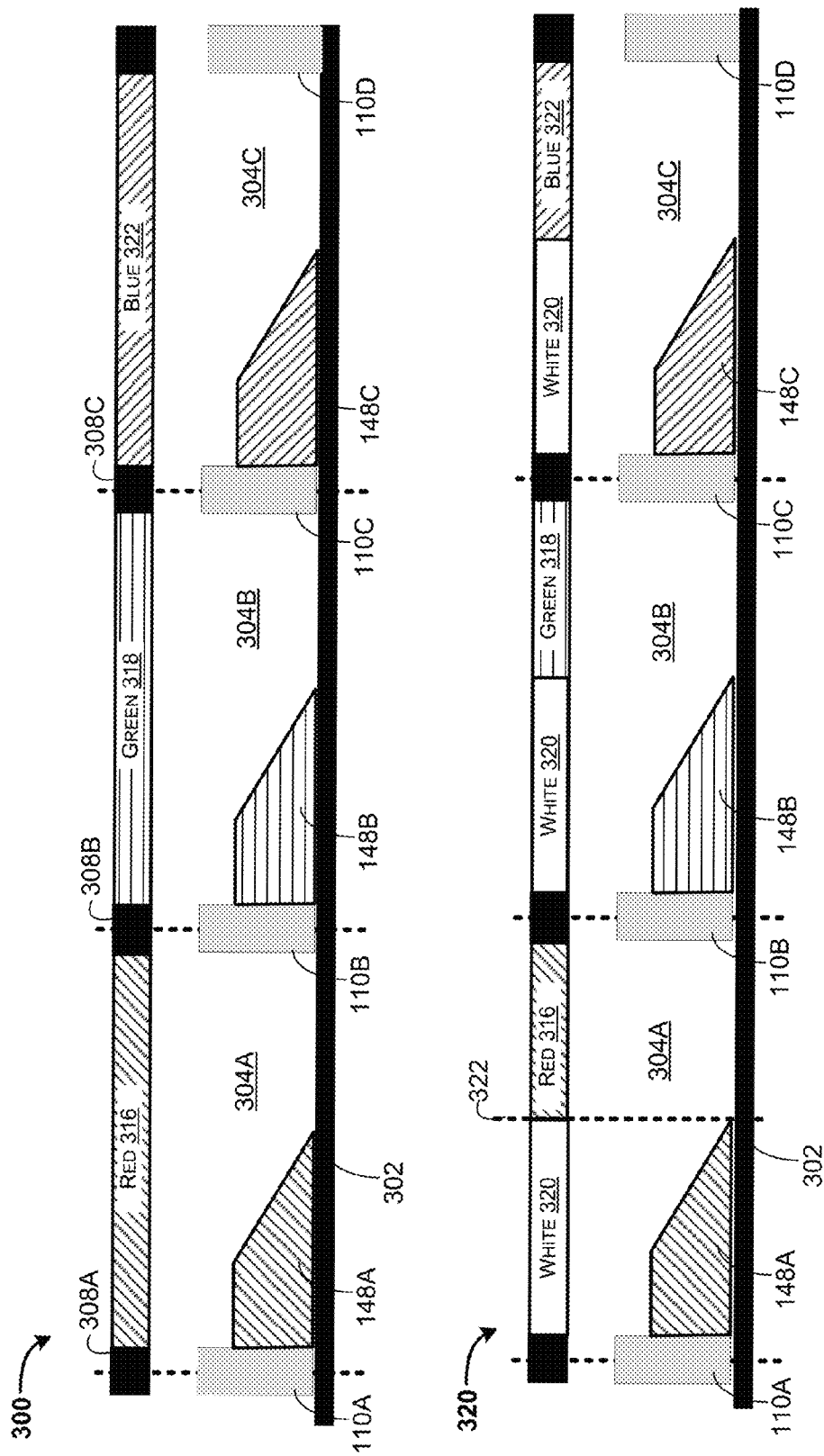
FIG. 3 shows cross-section views of electrowetting pixel regions including colored notches in a non-flipped configuration, according to some examples.

FIG. 3 shows cross-section views of electrowetting pixel regions including colored notches in a non-flipped configuration, according to some examples. The pixel regions illustrated is merely a portion of a larger number of pixel regions. In this particular example, the pixel regions includes red (R), green (G), and blue (B) pixel regions in an RGB configuration. Of course, any of a number of color configurations may be designed, including other colors, and claimed subject matter is not limited in this respect. As illustrated, the pixel regions include a red pixel region 304A, a green pixel region 304B, and a blue pixel region 304C. Accordingly, the red pixel region 304A includes a red color filter 316. The green pixel region 304B can include a green color filter and the blue pixel region 304C can include a blue color filter.

As discussed above, instead of including a white (W) pixel regions for an RGBW configuration, in some examples, the W pixel region is not included. Instead, each pixel region 304 includes a white color filter 320 and another color filter. A white color filter 320 can be a clear (or no) color filter. "Clear" indicates a substantially transparent material, in contrast to a colored material, such as a red, green, or blue colored material. In the current example illustrated by element 320, each of the pixel regions 304 includes a white color filter 320 and another color filter that depends on the color of the underlying pixel region. As illustrated, the pixel regions include a red pixel region 304A covered by a white color filter 320 and a red color filter 316. A green pixel region 304B covered by a white color filter 320 and a green color filter 318, and a blue pixel region 304C covered by a white color filter 320 and a blue color filter 322. In some examples, the white color filter extends to the end of the colored notch for the pixel region as illustrated by dashed line 322. In other examples, the white color filter can extend some other distance. For instance, the white color filter 320 may only cover a portion of the colored notch (e.g., to the beginning of the slope) or slightly past the end of the colored notch. In some examples, the pixel walls 110A-110C are covered by a corresponding black matrix 308A-308C that blocks at least a portion of light entering the pixel and the corresponding pixel wall 110.

Figure 4:
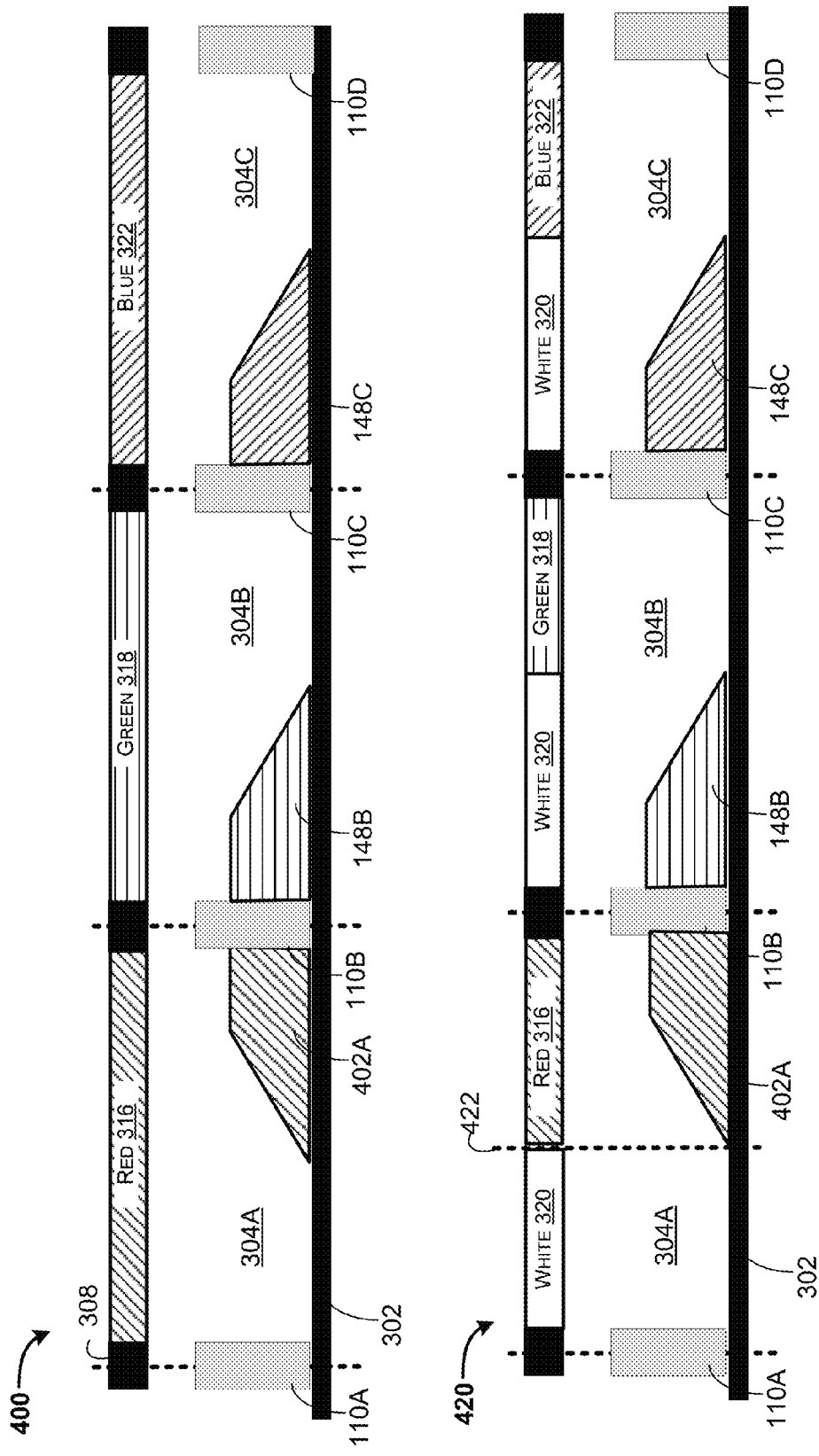
FIG. 4 shows cross-section views of electrowetting pixel regions including colored notches in a flipped configuration, according to some examples.

FIG. 4 shows cross-section views of electrowetting pixel regions including colored notches in a flipped configuration, according to some examples. The pixel regions illustrated is merely a portion of a larger number of pixel regions. In this particular example, the pixel regions includes red (R), green (G), and blue (B) pixel regions in an RGB configuration. Of course, any of a number of color configurations may be designed, including other colors, and claimed subject matter is not limited in this respect. As illustrated, the pixel regions include a red pixel region 304A, a green pixel region 304B, and a blue pixel region 304C. Accordingly, the red pixel region 304A includes a red color filter 316. The green pixel region 304B can include a green color filter and the blue pixel region 304C can include a blue color filter.

As discussed above, the colored notches may be arranged in a flipped configuration or a non-flipped configuration. In the current example, a flipped colored notch 402A is included in the red pixel region 304A. As can be seen, the flipped colored notch 402A and the colored notch 148B is adjacent to the same pixel wall 110B (but on opposing sides of the pixel wall 110B).

As illustrated by element 420, the pixel regions include a red pixel region 304A covered by a white color filter 320 and a red color filter 316. A green pixel region 304B covered by a white color filter 320 and a green color filter 318, and a blue pixel region 304C covered by a white color filter 320 and a blue color filter 322. In some examples, the white color filter extends to the end of the colored notch for the pixel region as illustrated by dashed line 422. In other examples, the white color filter can extend some other distance. For instance, the white color filter 320 may only cover a portion of the colored notch (e.g., to the beginning of the slope) or slightly past the end of the colored notch.

Figure 5:
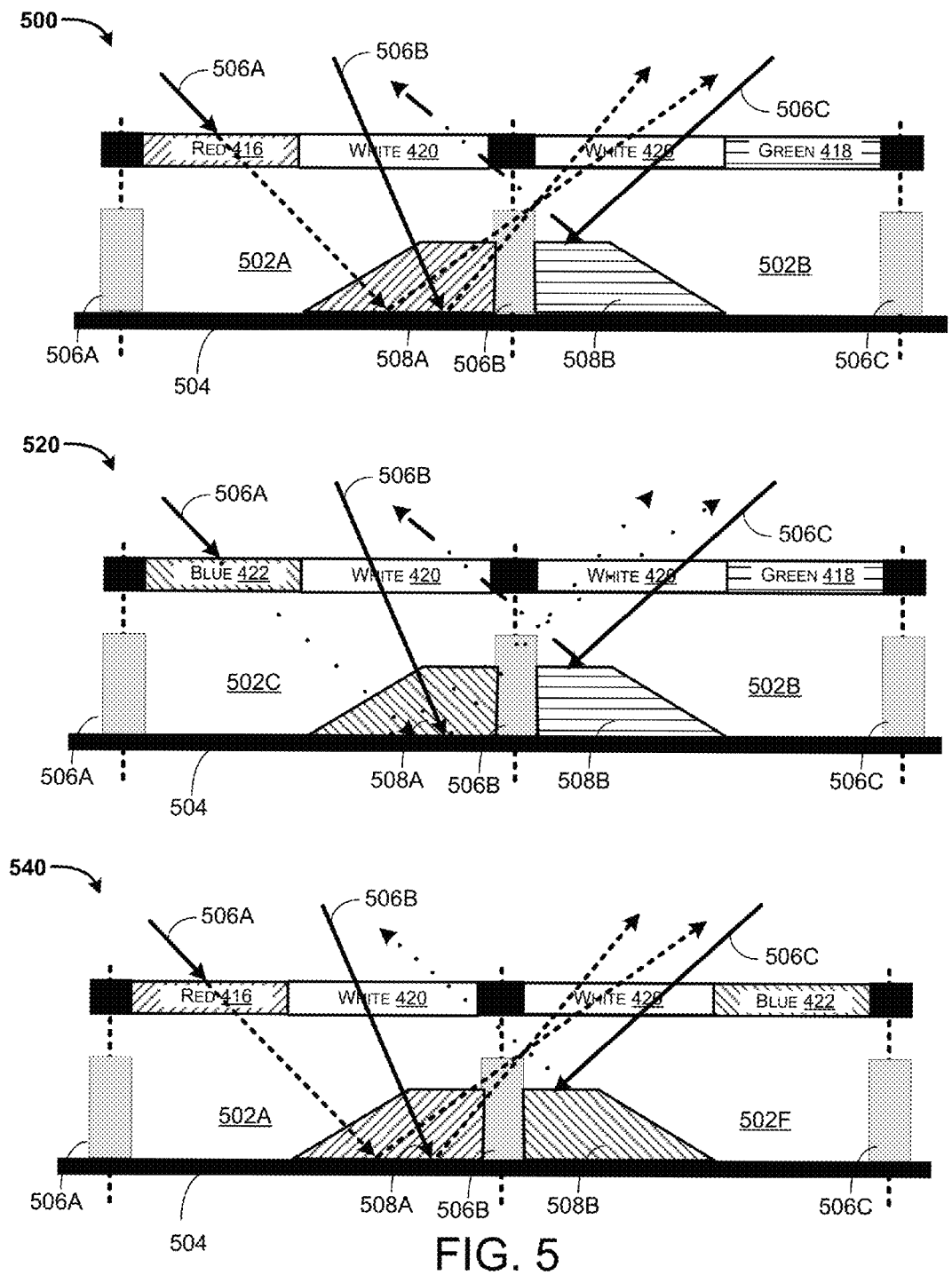
FIG. 5 shows cross-section views of electrowetting pixel regions with flipped colored notches including sample light rays for describing behavior or light as the light enters the pixel, according to some examples.

FIG. 5 shows cross-section views of electrowetting pixel regions with flipped colored notches including sample light rays for describing behavior or light as the light enters the pixel. Element 500 shows a red pixel region 502A, and a green pixel region 502B that includes a base layer 504, pixel walls 506A-506C, and colored notches 508A-508B. In some examples, the base layer 504 can be a hydrophobic layer located on a dielectric barrier layer that is above a conductive layer that is disposed on a bottom support plate (not shown).

Referring now to element 500, a red pixel region 502A includes a pixel wall 506A on one side of the pixel region and a pixel wall 506B on the other side of the pixel region.

The neighboring green pixel to the right of red pixel region 502A is a green pixel region. Pixel region 502A includes a red color filter 416 and a white color filter 420. The neighboring pixel region right of pixel region 502A includes a green color filter 418 and a white color filter 420. For sake of explanation, a particular example is considered where the colors of the pixels include red, green, and blue.

Generally, upon transmission, a color filter absorbs and/or reflects substantially all but a particular color of white light. In some examples, a red color filter may transmit light in a wavelength range having peak transmission (e.g., about 90% or 95%) at about 670 nm. A green color filter may transmit light in a wavelength range having peak transmission at about 520 nm. A blue color filter may transmit light in a wavelength range having peak transmission at about 460 nm.

For example, light rays 506A and 506B represents white light impinging upon red pixel region 502A at different angles of incidence. Light ray 506C represents white light impinging upon green pixel region 502B. White light is a broad spectrum of the visible portion of the EM spectrum having wavelengths ranging from about 400 nanometers (nm) to about 700 nm. Subsequent to transmission through red color filter 416, the resulting light rays (as indicated by dashed lines to indicate red light) comprise red light without green and blue light (the green and blue colors of the original light ray 506A having been absorbed and/or reflected). Red light rays can transmit through a clear pixel wall pixel or a red notch 508A, but may not penetrate into or transmit through different colors. Thus, a red light ray is at least partially absorbed by a blue material or a green material. In the current example, the red light ray resulting from the transmission of light ray 506A through red color filter 416 is at least partially reflected from a reflecting portion of an electrowetting display and reflected through green pixel region 502 through the white color filter 420.

Light ray 506B represents white light impinging upon red pixel region 502A. Subsequent to transmission through the white color filter 420, the resulting light rays comprise white light. As illustrated, the light ray 506B impinges upon the red notch 508A and red light is reflected through the green pixel region 502 via the white color filter 420.

Light ray 506C represents white light impinging upon a green pixel region 502B. If a light ray is transmitted through the green color filter 418, the resulting light rays would comprise green light without red and blue light (the red and blue colors of the original light ray having been absorbed and/or reflected). Green light rays can transmit through a green notch 508B, but may not penetrate into or transmit through the other materials of different colors. Thus, a green light ray is at least partially absorbed by a blue notch 508C and/or a red notch 508B. In the current example, the light ray 506C impinges the green notch 508B and green light is reflected through the white color filter 420 that is above the red notch 508A of the red pixel region 502A. As can be seen by referring to element 500, instead of light being absorbed (and not reflected) by a notch, the incoming light rays 506A-506C may be reflected to enhance the brightness of the display. Without the white color filter 420 covering a portion of the pixel regions, the incoming light rays 506A-506C would be absorbed and prevented from exiting the display.

A number of features may exist from the use of the colored notches and/or the white colored filter 420 in addition to a colored filter. One feature is that light that hits the colored notch absorbs about two thirds of the incident light (due to color filtering). This helps to increase contrast even though notch area contains thin layer of black electrowetting oil as compared to a thick layer of oil in non-notch area. Another feature is that the transmission of a color filter can be controlled to optimize display brightness independent of the color saturation of the colored notch. Optimization of transmission and color saturation can be done independently and simultaneously to achieve desired brightness, and color gamut. Further, the color of the color filters and the color of the colored notch can be designed independent of each other, thereby making design choices easy and flexible. The dimensions of the transparent area (e.g., the portion of the pixel region covered by the white color filter 420) within each sub pixel can be controlled for optimized brightness and color gamut. As also discussed above, in some examples, no white sub pixel is needed to gain extra brightness.

In another example, a blue pixel region 502C is adjacent to a green pixel region 502B as indicated by element 520. The transmission, absorption and reflection of the light rays 506 is similar to the transmission, absorption and reflection as illustrated by element 500. In yet another example, the red pixel region 502A is adjacent to a blue pixel region 502C as indicated by element 540. The transmission, absorption and reflection of the light rays 506 is similar to the transmission, absorption and reflection as illustrated by element 500.

Figure 6:
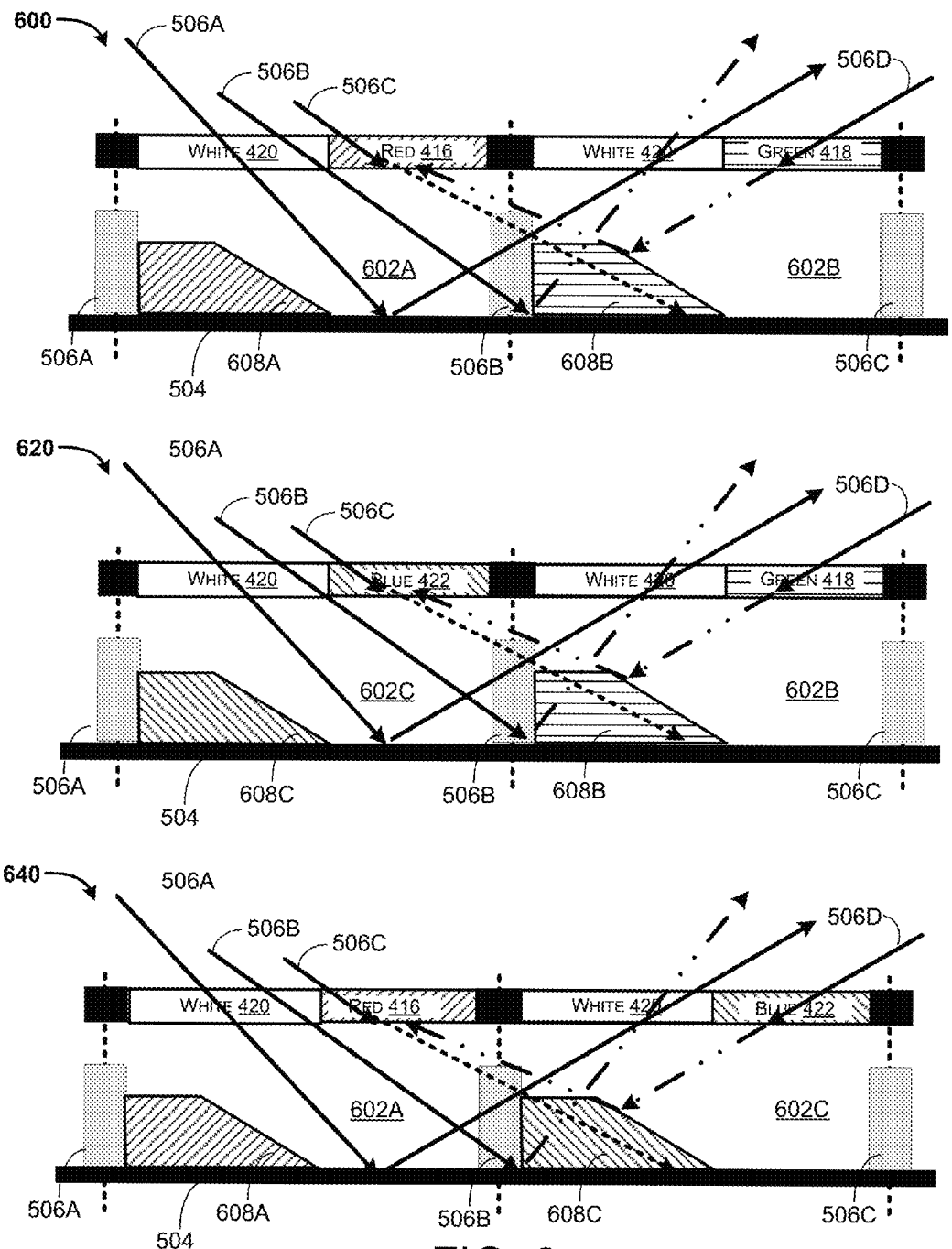
FIG. 6 shows cross-section views of electrowetting pixel regions with non-flipped colored notches including sample light rays for describing behavior or light as the light enters the pixel, according to some examples.

FIG. 6 shows cross-section views of electrowetting pixel regions with non-flipped colored notches including sample light rays for describing behavior or light as the light enters the pixel. Element 600 shows a red pixel region 602A, and a green pixel region 602B that includes a base layer 504, pixel walls 506A-506C, and colored notches 608A-608B. In the current examples illustrated in FIG. 6, the colored notches 608A-608C are not flipped as compared to the colored notches 508A-508C illustrated in the left hand pixel regions of FIG. 5. In some examples, the base layer 504 can be a hydrophobic layer located on a dielectric barrier layer that is above a conductive layer that is disposed on a bottom support plate (not shown).

Referring now to element 600, a red pixel region 602A includes a pixel wall 506A on one side of the pixel region and a pixel wall 506B on the other side of the pixel region. The red pixel region 602A includes a red colored notch 608A that is adjacent to the pixel wall 506A. In some examples, the red notch 608A may be a distinct physical part (but close too or touching) the pixel wall 506A. In other examples, the red notch 608A may be part of the pixel wall 506A (e.g., formed together or physically connected such that the material from the red notch 506A cross links with the material from the pixel wall 506A). The neighboring green pixel to the right of red pixel region 602A is a green pixel region 602B. Pixel region 602A includes a red color filter 416 and a white color filter 420. The white color filter 418 is located above the red notch 608A and the red color filter 416 is located above the portion of the pixel region 602A that does not include the red notch 608A. The neighboring pixel region right of pixel region 602A includes a green color filter 418 and a white color filter 420. The white color filter 418 is located above the red notch 608A and the green color filter 418 is located above the portion of the green pixel region 602B that does not include the green notch 608B. For sake of explanation, a particular example is considered where the colors of the pixels include red, green, and blue.

Light rays 506A, 506B, and 506C represents white light impinging upon red pixel region 502A at different angles of incidence. Light rays 506A-506B represent white light that enters through the white color filter 420. Light ray 506C represents white light that enters through the red color filter 416. Light ray 506D represents white light impinging upon green pixel region 502B through the green color filter 418. Subsequent to transmission through red color filter 416, the resulting light ray (as indicated by dashed lines to indicate red light) comprise red light without green and blue light (the green and blue colors of the original light ray 506C having been absorbed and/or reflected). Red light rays can transmit through a clear pixel wall pixel 506B or a red notch 608A, but may not penetrate into or transmit through different colors. Thus, a red light ray is at least partially absorbed by a blue material or a green material. In the current example, the red light ray resulting from the transmission of light ray 506C through red color filter 516 is absorbed by the green notch 608B.

Light ray 506A is reflected as white light through the white color filter 420 that is above the green notch 608B. Light ray 506B represents white light impinging upon red pixel region 502A that is reflected through the green notch 608B. The green notch 608B absorbs the red and blue light and reflects the green light (as indicated by the dotted and dashed lines) through the white color filter 420 of the green pixel region 602B.

Light ray 506D represents white light impinging upon a green pixel region 502B. If a light ray is transmitted through the green color filter 418, the resulting light rays would comprise green light without red and blue light (the red and blue colors of the original light ray having been absorbed and/or reflected). Green light rays can transmit through a green notch 508B, but may not penetrate into or transmit through the other materials of different colors. Thus, a green light ray is at least partially absorbed by a blue notch and/or a red notch. In the current example, the light ray 506D impinges the green notch 608B and green light is reflected through the pixel wall 506B and is absorbed by the red color filter 416. As can be seen, some light rays 506A-506B are reflected out of the adjacent pixel area resulting in increased brightness. Light ray 506C is absorbed by the green colored notch 608B and the reflected portion of light ray 506D is absorbed by the red color filter 416 thereby reducing cross talk.

In another example, a blue pixel region 602C is adjacent to a green pixel region 602B as indicated by element 620. The transmission, absorption and reflection of the light rays 606 is similar to the transmission, absorption and reflection as illustrated by element 600. In yet another example, the red pixel region 602A is adjacent to a blue pixel region 602C as indicated by element 640. The transmission, absorption and reflection of the light rays 506 as illustrate by element 640 is similar to the transmission, absorption and reflection as illustrated by element 600.

Figure 7:
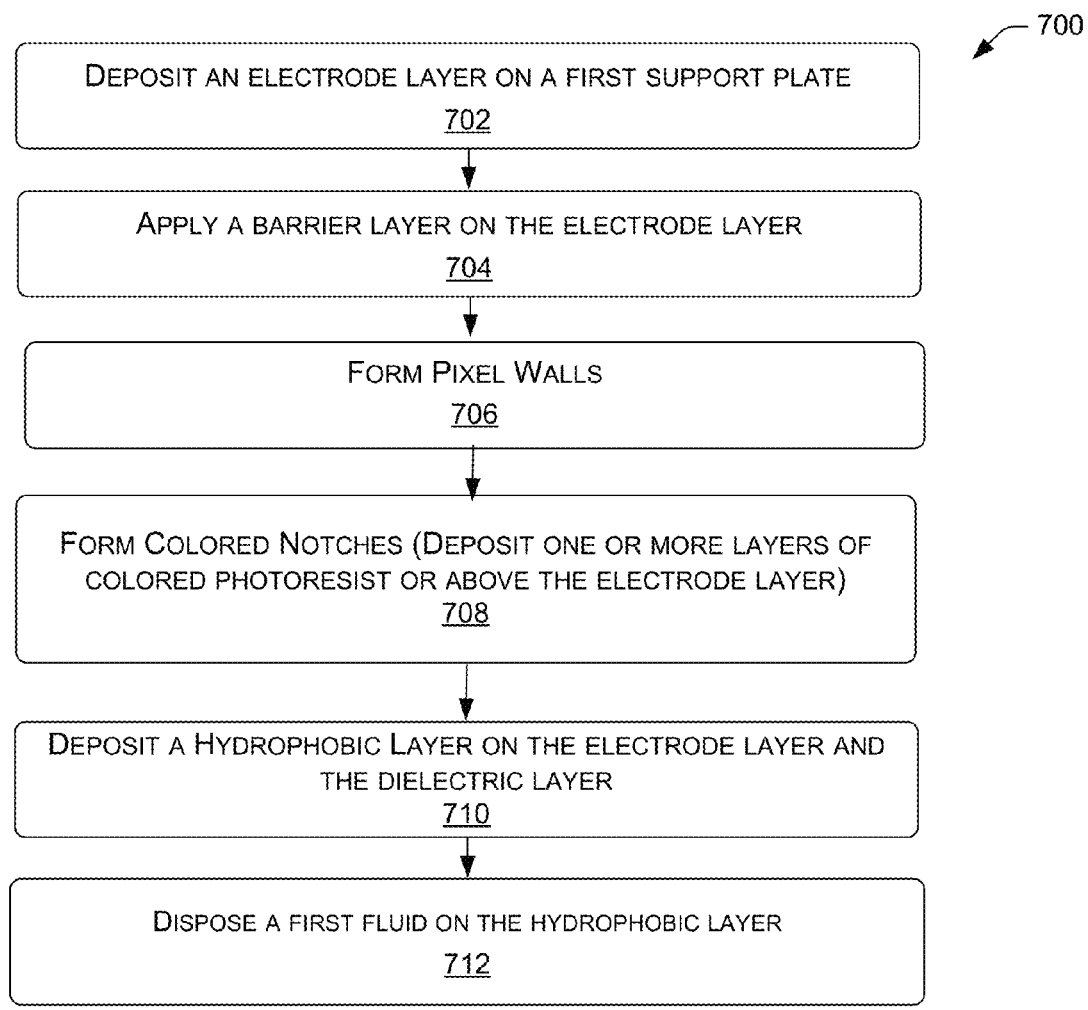
FIG. 7 is a flow diagram of a process for fabricating an electrowetting display device that includes colored notches, according to various example examples.

FIG. 7 is a flow diagram of a process 600 for fabricating an electrowetting display device that includes colored notches, according to various examples. For example, the display device may be the same as or similar to the display device illustrated in FIG. 1. Though claimed subject matter is not limited in this respect, process 700 may be performed by a person, an apparatus, a person operating an apparatus, or a combination thereof, for example.

At 702, an electrode layer is deposited on a first support plate. For example, such an electrode layer may be the same as or similar to 216 and first support plate may be the same as or similar to 214, illustrated in FIG. 2. Application may be performed by CVD, PVD, MBE, or sputtering, just to name a few examples.

At 704, a barrier layer is deposited on the electrode layer. The barrier layer, which may be the same as or similar to 218 illustrated in FIG. 2, may comprise an inorganic and/or organic dielectric material.

At 706, pixel walls can be formed. As described above, pixel regions of the electrowetting display are individually bordered by pixel walls. The pixel walls form a patterned electrowetting pixel grid on hydrophobic layer 108. Pixel walls 110 may comprise one or more photoresist materials such as, for example, epoxy-based photoresist SU-8. In some examples, the pixel walls 110 are clear or at least partially transparent.

At 708, colored notches 148 can be formed on or above the electrode layer. As described above, adjacent pixel regions include colored notches of different colors. The colored notches partially cover the electrode layer and the barrier layer. In some examples, the colored notch can be formed from one or more layers of a colored photoresist material, which may comprise a negative tone or positive tone photoresist made by diffusing pigments in a UV-curing resin, such as an acryl-epoxy resin, and by dissolving the resin in a solvent, for example. Photoresist may comprise SU8 or a JSR photoresist, just to name a few examples. The photoresist material may be applied on the support plate by coating techniques, such as spin coating or slit coating, and so on.

According to some examples, the colored notches are formed from multiple layers of photoresist material that have different lengths. For instance, in forming a colored notch 148 that tapers between the top surface of the colored notch and the bottom surface of the colored notch, the bottom layer of a colored notch can be deposited first on a layer above the electrode layer, followed by depositing shorter subsequent layers to form the colored notch. Generally, the taper is smoother when more layers are used. The fewer layers deposited can result in a colored notch that has more of a stair-step pattern as compared to a smooth taper from the bottom surface to the top surface. In some examples, the layers used to form the colored notch can be colored the same. In other configurations, one or more of the layers used to form the colored notch may be colored differently. In other configurations, the taper of the colored notch can be formed using different techniques. For example, the end of the colored notch can be sanded, or cut, to form taper from the top surface to the bottom surface.

At 710, to hydrophobic layer can be deposited on the electrode layer and the dielectric layer. The hydrophobic layer may be applied on the support plate by coating techniques, such as spin coating or slit coating, and so on.

At 712, a first fluid can be disposed on the hydrophobic layer. As discussed above, a first fluid 112, which may have a thickness (e.g., depth, height) in a range of about 1 to 10 microns overlies a hydrophobic layer 108. The first fluid 112 is partitioned by pixel walls 110 of the patterned electrowetting pixel grid. The first fluid 112 can cover the colored notch within a pixel region.

Figure 8:
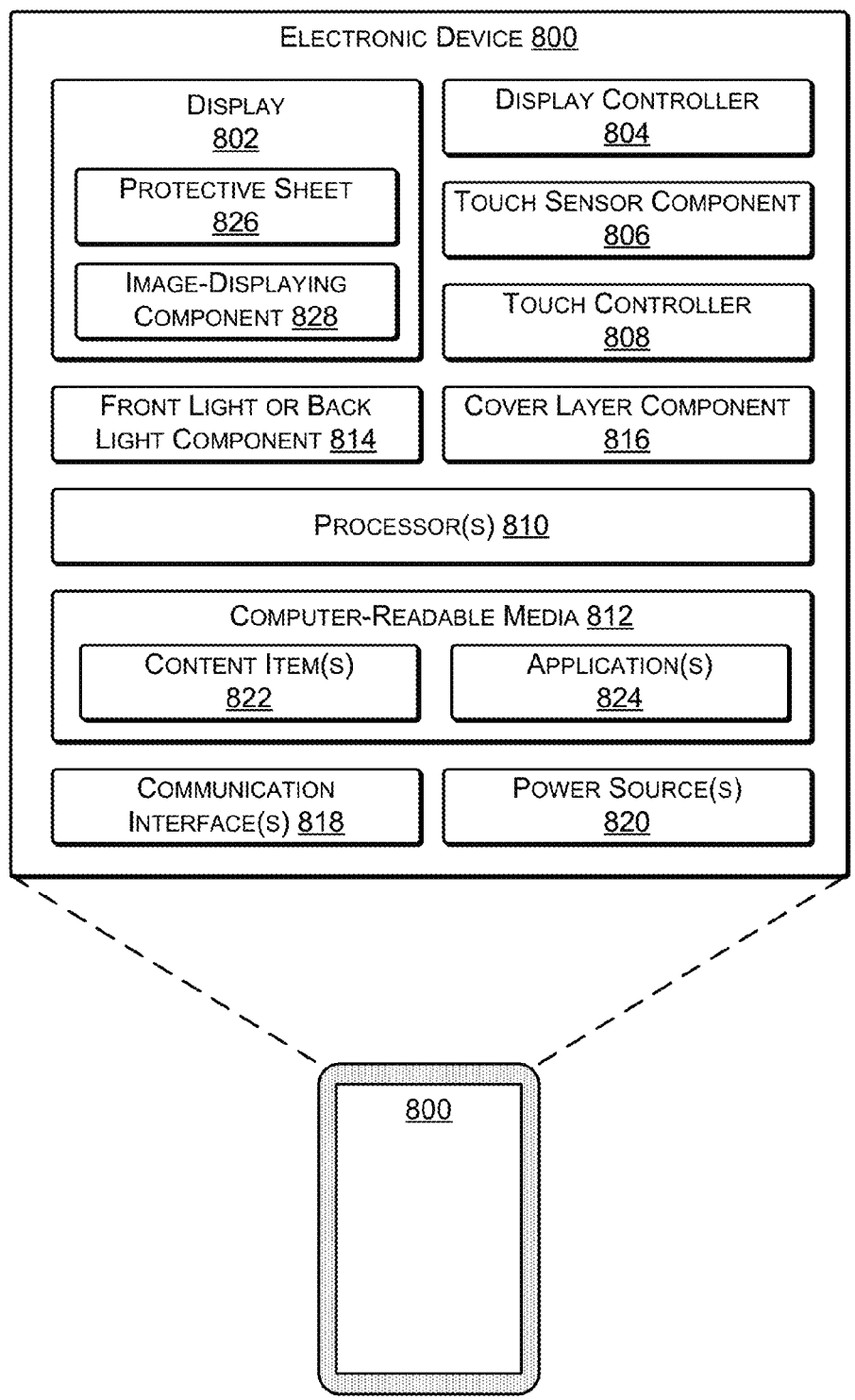
FIG. 8 illustrates an example electronic device that may incorporate a display device, according to some examples.

FIG. 8 illustrates an example electronic device 800 that may incorporate any of the display devices discussed above. The device 800 may comprise any type of electronic device having a display. For instance, the device 800 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 800 may be a non-mobile electronic device (e.g., a computer display, a television, etc.). In addition, while FIG. 8 illustrates several example components of the electronic device 800, it is to be appreciated that the device 800 may also include other conventional components, such as an operating system, system busses, input/output components, and the like. Further, in other examples, such as in the case of a television or computer monitor, the electronic device 800 may only include a subset of the components illustrated.

Regardless of the specific implementation of the electronic device 800, the device 800 includes a display 802 and a corresponding display controller 804. The display 802 may represent a reflective or transmissive display in some instances.

In an implementation, the display comprises an electrowetting display that employs an applied voltage to change the surface tension of a fluid in relation to a surface. For example, such an electrowetting display may include the array of pixels 300 illustrated in FIG. 3, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by contracting a colored oil film if a voltage is applied to individual pixels of the display. If the voltage is absent, the colored oil forms a continuous film within a pixel, and the color may thus be visible to a user of the display. On the other hand, if the voltage is applied to the pixel, the colored oil is displaced and the pixel becomes transparent. If multiple pixels of the display are independently activated, the display may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays may be suitable for applications such as displaying video content.

Of course, while several different examples have been given, it is to be appreciated that while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples are described in the environment of a reflective display, in other examples, the display 802 may represent a backlit display, examples of which are mentioned above.

In addition to including the display 802, FIG. 8 illustrates that some examples of the device 800 may include a touch sensor component 806 and a touch controller 808. In some instances, at least one touch sensor component 806 resides with, or is stacked on, the display 802 to form a touch-sensitive display. Thus, the display 802 may be capable of both accepting user touch input and rendering content in response to or corresponding to the touch input. As several examples, the touch sensor component 806 may comprise a capacitive touch sensor, a force sensitive resistance (FSR), an interpolating force sensitive resistance (IFSR) sensor, or any other type of touch sensor. In some instances, the touch sensor component 806 is capable of detecting touches as well as determining an amount of pressure or force of these touches.

FIG. 8 further illustrates that the electronic device 800 may include one or more processors 810 and one or more computer-readable media 812, as well as a front light component 814 (which may alternatively be a backlight component in the case of a backlit display) for lighting the display 802, a cover layer component 816, such as a cover glass or cover sheet, one or more communication interfaces 818 and one or more power sources 820. The communication interfaces 818 may support both wired and wireless connection to various networks, such as cellular networks, radio, WiFi networks, short range networks (e.g., Bluetooth®), infrared (IR), and so forth.

Depending on the configuration of the electronic device 800, the computer-readable media 812 (and other computer-readable media described throughout) is an example of computer storage media and may include volatile and non-volatile memory. Thus, the computer-readable media 812 may include, but is not limited to, RAM, ROM, EEPROM, flash memory, or other memory technology, or any other medium that may be used to store computer-readable instructions, programs, applications, media items, and/or data which may be accessed by the electronic device 800.

The computer-readable media 812 may be used to store any number of functional components that are executable on the processor 810, as well as content items 822 and applications 824. Thus, the computer-readable media 812 may include an operating system and a storage database to store one or more content items 822, such as eBooks, audio books, songs, videos, still images, and the like. The computer-readable media 812 of the electronic device 800 may also store one or more content presentation applications to render content items on the device 800. These content presentation applications may be implemented as various applications 824 depending upon the content items 822. For instance, the content presentation application may be an electronic book reader application for rending textual electronic books, an audio player for playing audio books or songs, a video player for playing video, and so forth.

In some instances, the electronic device 800 may couple to a cover (not illustrated in FIG. 8) to protect the display (and other components in the display stack or display assembly) of the device 800. In one example, the cover may include a back flap that covers a back portion of the device 800 and a front flap that covers the display 802 and the other components in the stack. The device 800 and/or the cover may include a sensor (e.g., a Hall effect sensor) to detect if the cover is open (i.e., if the front flap is not atop the display and other components). The sensor may send a signal to the front light component 814 if the cover is open and, in response, the front light component 814 may illuminate the display 802. If the cover is closed, meanwhile, the front light component 814 may receive a signal indicating that the cover has closed and, in response, the front light component 814 may turn off.

Furthermore, the amount of light emitted by the front light component 814 may vary. For instance, upon a user opening the cover, the light from the front light may gradually increase to its full illumination. In some instances, the device 800 includes an ambient light sensor (not illustrated in FIG. 8) and the amount of illumination of the front light component 814 may be based at least in part on the amount of ambient light detected by the ambient light sensor. For example, the front light component 814 may be dimmer if the ambient light sensor detects relatively little ambient light, such as in a dark room; may be brighter if the ambient light sensor detects ambient light within a particular range;

and may be dimmer or turned off if the ambient light sensor detects a relatively large amount of ambient light, such as direct sunlight.

In addition, the settings of the display 802 may vary depending on whether the front light component 814 is on or off, or based on the amount of light provided by the front light component 814. For instance, the electronic device 800 may implement a larger default font or a greater contrast if the light is off compared to if the light is on. In some instances, the electronic device 800 maintains, if the light is on, a contrast ratio for the display that is within a certain defined percentage of the contrast ratio if the light is off.

As described above, the touch sensor component 806 may comprise a capacitive touch sensor that resides atop the display 802. In some examples, the touch sensor component 806 may be formed on or integrated with the cover layer component 816. In other examples, the touch sensor component 806 may be a separate component in the stack of the display assembly. The front light component 814 may reside atop or below the touch sensor component 806. In some instances, either the touch sensor component 806 or the front light component 814 is coupled to a top surface of a protective sheet 826 of the display 802. As one example, the front light component 814 may include a lightguide sheet and a light source (not illustrated in FIG. 8). The lightguide sheet may comprise a substrate (e.g., a transparent thermoplastic such as PMMA or other acrylic), a layer of lacquer and multiple grating elements formed in the layer of lacquer that function to propagate light from the light source towards the display 802, thus illuminating the display 802.

The cover layer component 816 may include a transparent substrate or sheet having an outer layer that functions to reduce at least one of glare or reflection of ambient light incident on the electronic device 800. In some instances, the cover layer component 816 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3$h$ pencil). Without such scratch resistance, a device may be more easily scratched and a user may perceive the scratches from the light that is dispersed over the top of the reflective display. In some examples, the protective sheet 826 may include a similar UV-cured hard coating on the outer surface. The cover layer component 816 may couple to another component or to the protective sheet 826 of the display 802. The cover layer component 816 may, in some instances, also include a UV filter, a UV-absorbing dye, or the like, for protecting components lower in the stack from UV light incident on the electronic device 800. In still other examples, the cover layer component 816 may include a sheet of high-strength glass having an antiglare and/or antireflective coating.

The display 802 includes the protective sheet 826 overlying an image-displaying component 828. For example, the display 802 may be preassembled to have the protective sheet 826 as an outer surface on the upper or image-viewing side of the display 802. Accordingly, the protective sheet 826 may be integral with and may overlay the image-displaying component 828. The protective sheet 826 may be optically transparent to enable a user to view, through the protective sheet 826, an image presented on the image-displaying component 828 of the display 802.

In some examples, the protective sheet 826 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 826 may include a coating, such as the hard coating described above. For instance, the hard coating may be applied to the outer surface of the protective sheet 826 before or after assembly of the protective sheet 826 with the image-displaying component 828 of the display 802. In some examples, the hard coating may include a photoinitiator or other reactive species in its composition, such as for curing the hard coating on the protective sheet 826. Furthermore, in some examples, the protective sheet 826 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 826, thereby protecting the image-displaying component 828 from UV light.

According to some implementations herein, one or more of the components discussed above may be coupled to the display 802 using fluid optically-clear adhesive (LOCA). For example, suppose that the light guide portion of the front light component 814 is to be coupled to the display 802. The light guide may be coupled to the display 802 by placing the LOCA on the outer or upper surface of the protective sheet 826. If the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 814 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 814. In other implementations, the LOCA may be placed near a center of the protective sheet 826, and pressed outwards towards a perimeter of the top surface of the protective sheet 826 by placing the front light component 814 on top of the LOCA. The LOCA may then be cured by directing UV light through the front light component 814. As discussed above, and as discussed additionally below, various techniques, such as surface treatment of the protective sheet, may be used to prevent discoloration of the LOCA and/or the protective sheet 826.

While FIG. 8 illustrates a few example components, the electronic device 800 may have additional features or functionality. For example, the device 800 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within the device 800 may reside remotely from the device 800 in some implementations. In these implementations, the device 800 may utilize the communication interfaces 818 to communicate with and utilize this functionality.

As illustrated, a display device, such as an electrowetting display device, may be a transmissive, reflective or transflective display that generally includes an array of pixels (e.g., which may comprise subpixels) configured to be operated by an active matrix addressing scheme. For example, rows and columns of electrowetting pixels are operated by controlling voltage levels on a plurality of source lines and gate lines. In this fashion, the display device may produce an image by selecting particular pixels to transmit, reflect or block light. Pixels are addressed (e.g., selected) via rows and columns of the source lines and gate lines that are electrically connected to transistors (e.g., used as switches) included in each pixel. Transistors take up a relatively small fraction of the area of each pixel to allow light to efficiently pass through (or reflect from) the display pixel. Herein, a pixel may, unless otherwise specified, comprise a subpixel or pixel that includes two or more subpixels of an electrowetting display device. Such a pixel or subpixel may be the smallest light transmissive, reflective or transflective pixel of a display that is individually operable to directly control an amount of light transmission through or reflection from the pixel. For example, in some implementations, a pixel may comprise a red subpixel, a green subpixel, and a blue subpixel. In other implementations, a pixel may be a smallest component, e.g., the pixel does not include any subpixels.

Example examples include, but are not limited to, reflective electrowetting displays that include a clear top support plate and a bottom support plate, which need not be transparent. The clear top support plate may comprise glass or any of a number of transparent materials and may be made of a rigid or flexible material, such as plastic (e.g., a transparent thermoplastic such as PMMA or other acrylic), quartz, semiconductors, and so on, and claimed subject matter is not limited in this respect. "Top" and "bottom", as used to identify the support plates of an electrowetting display, do not necessarily refer to a direction referenced to gravity or to a viewing side of the electrowetting display. Also, as used for sake of convenience of describing example examples, the top support plate is that through which viewing of pixels of a (reflective) electrowetting display occurs.

In some examples, a reflective electrowetting display comprises an array of pixels sandwiched between a bottom support plate and a top support plate. The bottom support plate may be opaque while the top support plate is transparent. Herein, describing a pixel or material as being "transparent" means that the pixel or material may transmit a relatively large fraction of the light incident upon it. For example, a transparent material or layer may transmit more than 70% or 80% of the light impinging on its surface, though claimed subject matter is not limited in this respect.

Pixel walls retain at least a first fluid which is electrically non-conductive, such as opaque or colored oil, in the individual pixels. A cavity formed between the support plates is filled with the first fluid (e.g., retained by pixel walls) and a second fluid (e.g., considered to be an electrolyte solution) that is electrically conductive or polar and may be a water or a salt solution such as a solution of potassium chloride water. The second fluid may be transparent, but may be colored, or light-absorbing. The second fluid is immiscible with the first fluid. As discussed above, the pixel regions can include colored notches.

Individual reflective electrowetting pixels may include a reflective layer on the bottom support plate of the electrowetting pixel, a transparent electrode layer adjacent to the reflective layer, and a hydrophobic fluoropolymer (AF) layer on the electrode layer. Pixel walls of each pixel, the hydrophobic layer, and the transparent top support plate at least partially enclose a liquid region that includes an electrolyte solution and an opaque liquid, which is immiscible with the electrolyte solution. An "opaque" liquid, as described herein, is used to describe a liquid that appears black to an observer. For example, an opaque liquid strongly absorbs a broad spectrum of wavelengths (e.g., including those of red, green and blue) in the visible region of electromagnetic radiation. In some implementations, the opaque liquid is a nonpolar electrowetting oil.

The opaque liquid is disposed in the liquid region. As described in detail below, coverage area of the opaque liquid on the bottom hydrophobic layer is electronically adjustable to affect the amount of light incident on the reflective electrowetting display that reaches the reflective material at the bottom of each pixel.

In addition to pixels, spacers and edge seals may also be located between two support plates. Support plates may comprise any of a number of materials, such as plastic, glass, quartz, semiconductors, and so on, and claimed subject matter is not limited in this respect.

Spacers and edge seals which mechanically connect a first support plate with a second overlying support plate, or which form a separation between the first support plate and the second support plate, contribute to mechanical integrity of the electrowetting display. Edge seals, for example, being disposed along a periphery of an array of electrowetting pixels, may contribute to retaining (e.g., first and second) fluids between the first support plate and the second overlying support plate. Spacers are desirably transparent so as to not hinder throughput of light in the electrowetting display. Transparency of spacers may at least partially depend on the refractive index of the spacer material, which should be similar to or the same as the refractive indices of surrounding media. Spacers are also desirably chemically inert to surrounding media.

In some examples, a display device as described may comprise a portion of a system that includes one or more processors and one or more computer memories, which may reside on a control board, for example. Display software may be stored on the one or more memories and may be operable with the one or more processors to modulate light that is received from an outside source (e.g., ambient room light) or out-coupled from a light guide of the display device. For example, display software may include code executable by a processor to modulate optical properties of individual pixels of the electrowetting display based, at least in part, on electronic signals representative of image or video data. The code may cause the processor to modulate the optical properties of pixels by controlling electrical signals (e.g., voltages, currents, fields, and so on) on, over, or in layers of the electrowetting display.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all examples falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

It will be understood that when an element or layer is referred to as being "on", "over", or "connected to" another element or layer, it can be directly on, connected or coupled to the other element or layer or intervening elements or layers may be present. In contrast, when an element is referred to as being "directly on" or "directly connected to" another element or layer, there are no intervening elements or layers present.

Reference throughout this specification to "one example" or "an example" may mean that a particular feature, structure, or characteristic described in connection with a particular example may be included in at least one example of claimed subject matter. Thus, appearances of the phrase "in one example" or "an example" in various places throughout this specification are not necessarily intended to refer to the same example or to any one particular example described. Furthermore, it is to be understood that particular features, structures, or characteristics described may be combined in various ways in one or more examples. In general, of course, these and other issues may vary with the particular context of usage. Therefore, the particular context of the description or the usage of these terms may provide helpful guidance regarding inferences to be drawn for that context.

What is claimed is:

1. An electrowetting display device comprising:
   a bottom support plate;
   a top support plate positioned above the bottom support plate and substantially parallel to the bottom support plate, wherein a space between the bottom support plate and the top support plate includes a plurality of pixel regions for presenting content on the electrowetting display device;
   a first pixel region surrounded by a first pixel wall of a first height, the first pixel wall disposed on a barrier layer above the bottom support plate, wherein the first pixel wall comprises a photoresist material;
   a first colored notch formed from the photoresist material infused with a first pigment of a first color, the first colored notch disposed on the barrier layer within the first pixel region, wherein:
      the first colored notch has a length that is less than one third of a width of the first pixel region;
      the first colored notch extends from a first side of the first pixel wall toward an opposing second end of the first pixel region;
      a width of the first colored notch is substantially the width of the first pixel region; and
      a height of the first colored notch is less than the first height of the first pixel wall.
   a hydrophobic layer disposed above at least a portion of the colored notch and a portion of the barrier layer above the bottom support plate; and
   a first color filter of the first color that covers an area of the first pixel region that does not include the first colored notch.

2. The electrowetting display device of claim 1, further comprising a second color filter that is adjacent to the first color filter, wherein the second color filter covers a second area of the pixel region that includes the first colored notch.

3. The electrowetting display device of claim 1, wherein the first colored notch comprises an end portion that tapers from a top surface of the first colored notch to a bottom surface of the first colored notch.

4. The electrowetting display device of claim 1, further comprising a second colored notch formed from the photoresist material infused with a second pigment of a second color, the second colored notch disposed on the barrier layer within a second pixel region that is adjacent to the first pixel region, wherein the second colored notch extends from a second side of the first pixel wall toward an opposing second end of the second pixel region, wherein a width of the second colored notch is the width of the first colored notch, wherein a length of the second colored notch is the length of the first colored notch, and wherein a height of the second colored notch is less than the first height of the pixel wall.

5. The electrowetting display device of claim 1, wherein each of the first pixel region and the second pixel region includes, respectively:
   a pixel electrode disposed on the bottom support plate;
   a hydrophobic layer portion disposed on the pixel electrode;
   an electrowetting oil disposed on the hydrophobic layer portion; and
   an electrolyte solution at least partially surrounding the electrowetting oil.

6. An electrowetting display device, comprising:
   a bottom support plate;
   a top support plate positioned above the bottom support plate and substantially parallel to the bottom support plate, wherein a space between the bottom support plate and the top support plate includes pixel regions;
   a first pixel wall associated with a first pixel region; and
   a first colored notch of a first color, the first colored notch adjacent to the first pixel wall within the first pixel region, wherein:
      the first colored notch extends a first distance from the first pixel wall toward an opposing end of the first pixel region;
      a width of the first colored notch is at least substantially near a width of the first pixel region; and
      a height of the first colored notch is less than a height of the first pixel wall.

7. The electrowetting display device of claim 6, wherein the first colored notch tapers between a top surface of the first colored notch and a bottom surface of the first colored notch such that the top surface is shorter in length as compared to the bottom surface.

8. The electrowetting display device of claim 6, further comprising a first color filter having the first color, wherein the first color filter is positioned above a portion of the first pixel region that does not include the first colored notch.

9. The electrowetting display device of claim 8, further comprising a clear color filter that is adjacent to the first color filter, wherein the clear color filter is positioned above a second portion of the first pixel region that includes the first colored notch.

10. The electrowetting display device of claim 6, further comprising:
    a second pixel wall associated with the first pixel region and a second pixel region, the second pixel region adjacent to the first pixel region; and a second colored notch of a second color, the second colored notch adjacent to the second pixel wall and disposed within the second pixel region, wherein the second colored notch extends a second distance from the second pixel wall toward an opposing end of the second pixel region and wherein a height of the second colored notch is less than a height of the second pixel wall.

11. The electrowetting display device of claim 6, further comprising a second colored notch of a second color, the second colored notch adjacent to the first pixel wall and within a second pixel region, wherein the second colored notch extends a third distance from the first pixel wall toward an opposing end of the second pixel region, and wherein a height of the second colored notch is less than a height of the first pixel wall.

12. The electrowetting display device of claim 6, wherein the first distance is more than ten percent of a width of the first pixel region.

13. The electrowetting display device of claim 6, further comprising an electrowetting oil covering at least a portion of the first colored notch.

14. The electrowetting display device of claim 6, further comprising a hydrophobic layer covering at least a portion of the first colored notch.

15. The electrowetting display device of claim 6, wherein the first colored notch comprises a photoresist material including a first pigment having the first color.

16. The electrowetting display device of claim 6, wherein a thickness of the first colored notch is less than about seventy five percent of a height of the first pixel wall.

17. The electrowetting display device of claim 1, wherein the first colored notch comprises multiple layers of a photoresist, and the photoresist comprises at least one diffused pigment.

18. The electrowetting display device of claim 1, wherein the first colored notch comprises at least a first photoresist layer having a first length and a second photoresist layer having a second length, wherein the second photoresist layer is disposed on top of the first photoresist layer and the first length is larger than the second length.

19. The electrowetting display device of claim 6, wherein the first colored notch comprises multiple layers of a photoresist, and the photoresist comprises at least one diffused pigment of the first color.

20. The electrowetting display device of claim 7, wherein the first colored notch comprises at least a first photoresist layer having a first length and a second photoresist layer having a second length, wherein the second photoresist layer is disposed on top of the first photoresist layer and the first length is larger than the second length.

\* \* \* \* \*